June 14, 1966  C. W. BRANDON  3,255,820
METHOD OF TREATING WELLS BY USE OF IMPLOSIVE REACTIONS
Filed Nov. 16, 1959  6 Sheets-Sheet 1

CLARENCE W. BRANDON
*INVENTOR.*

BY James R. Head

ATTORNEY

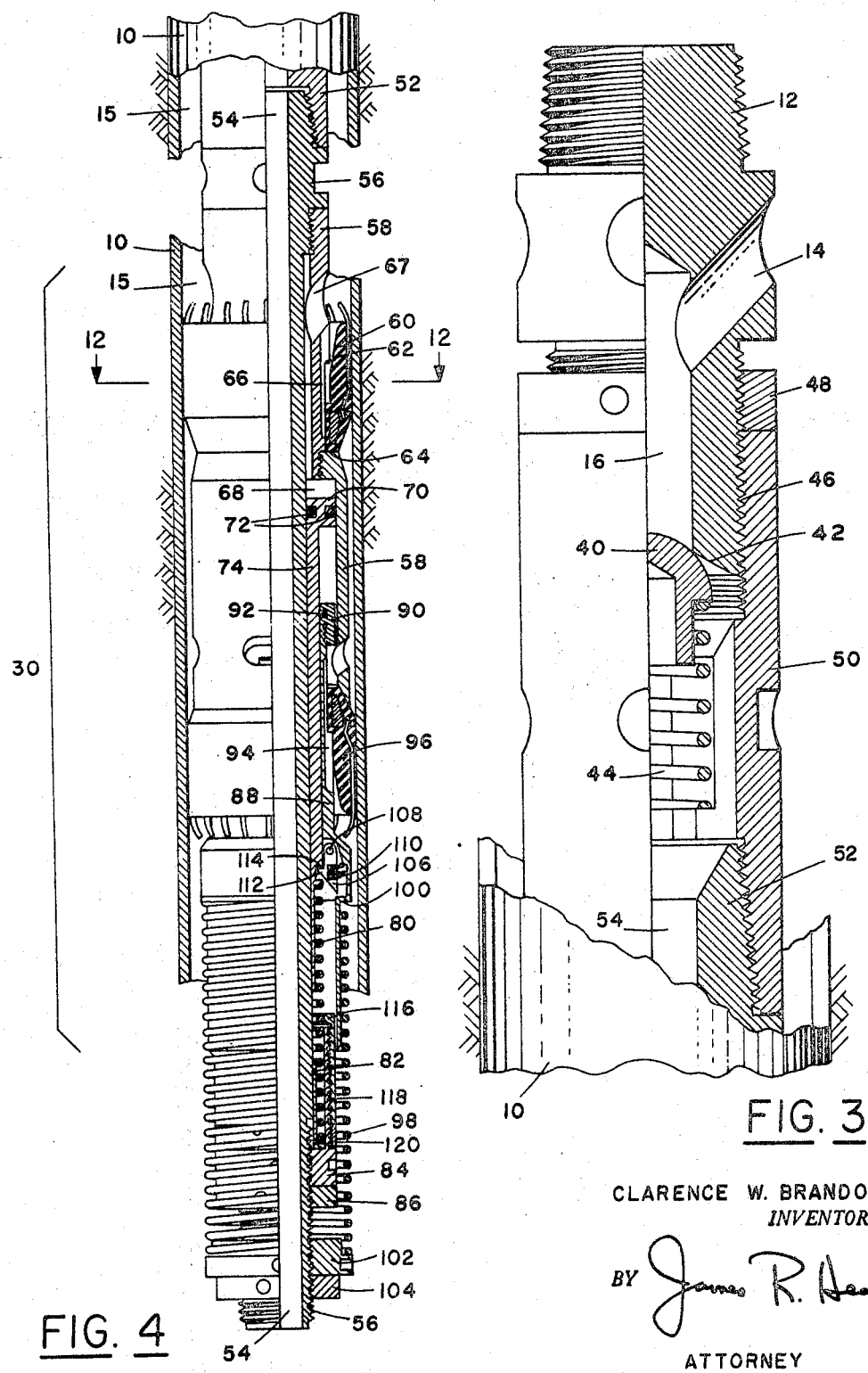

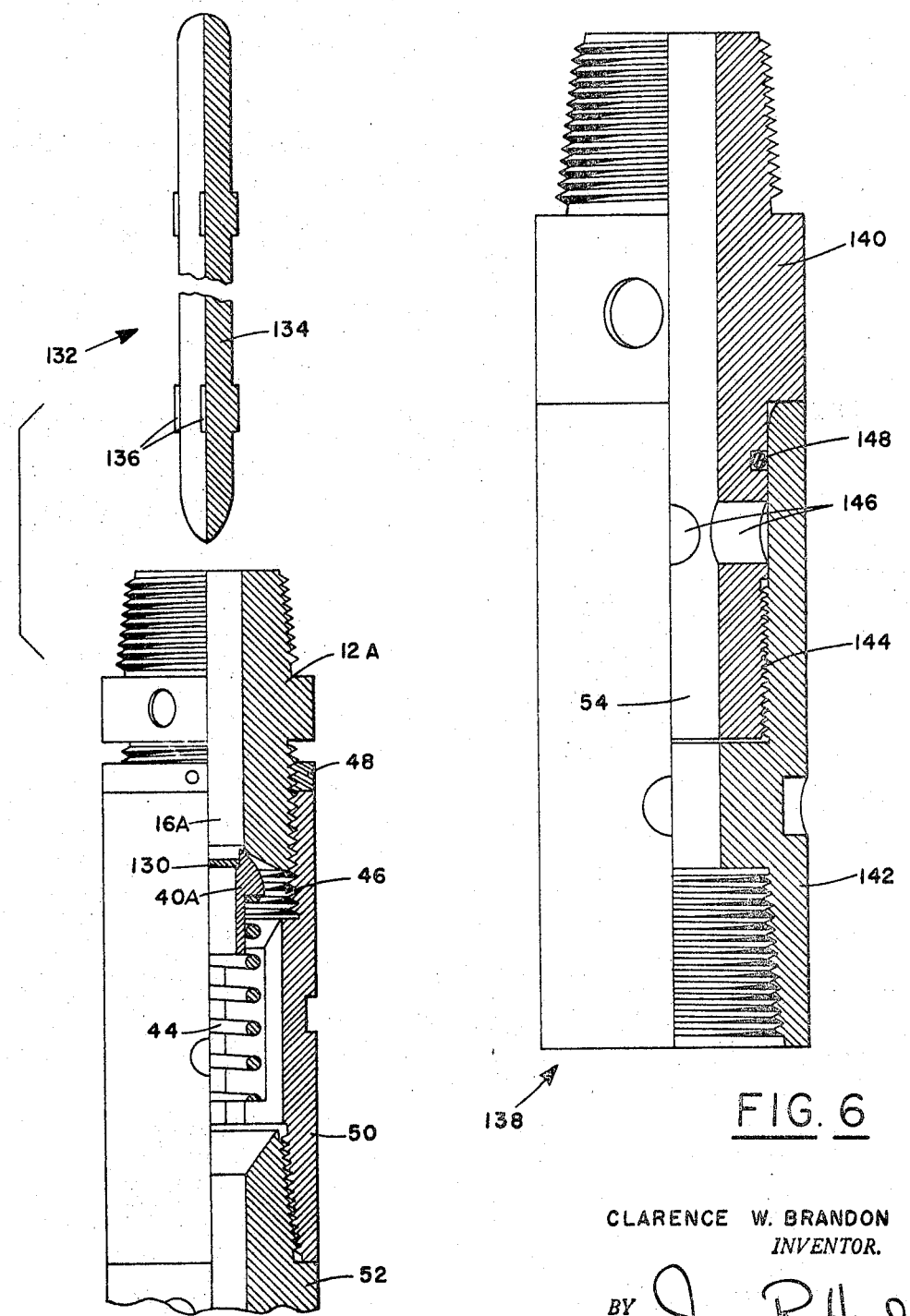

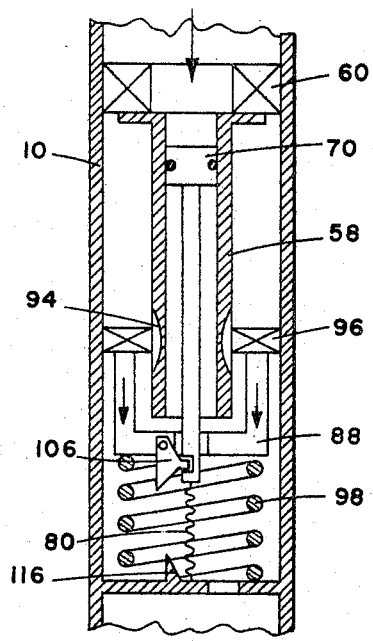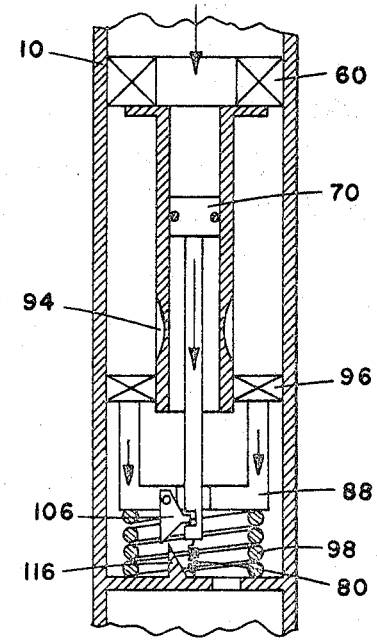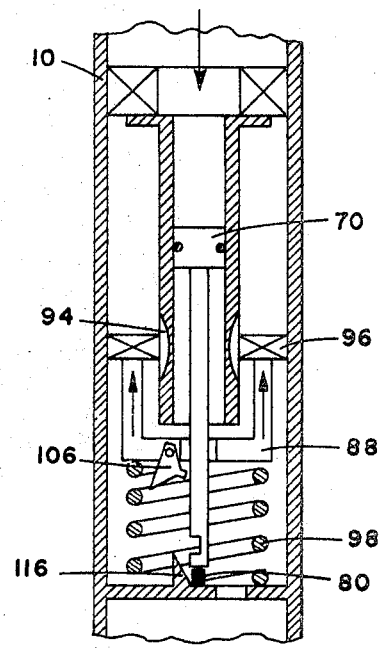

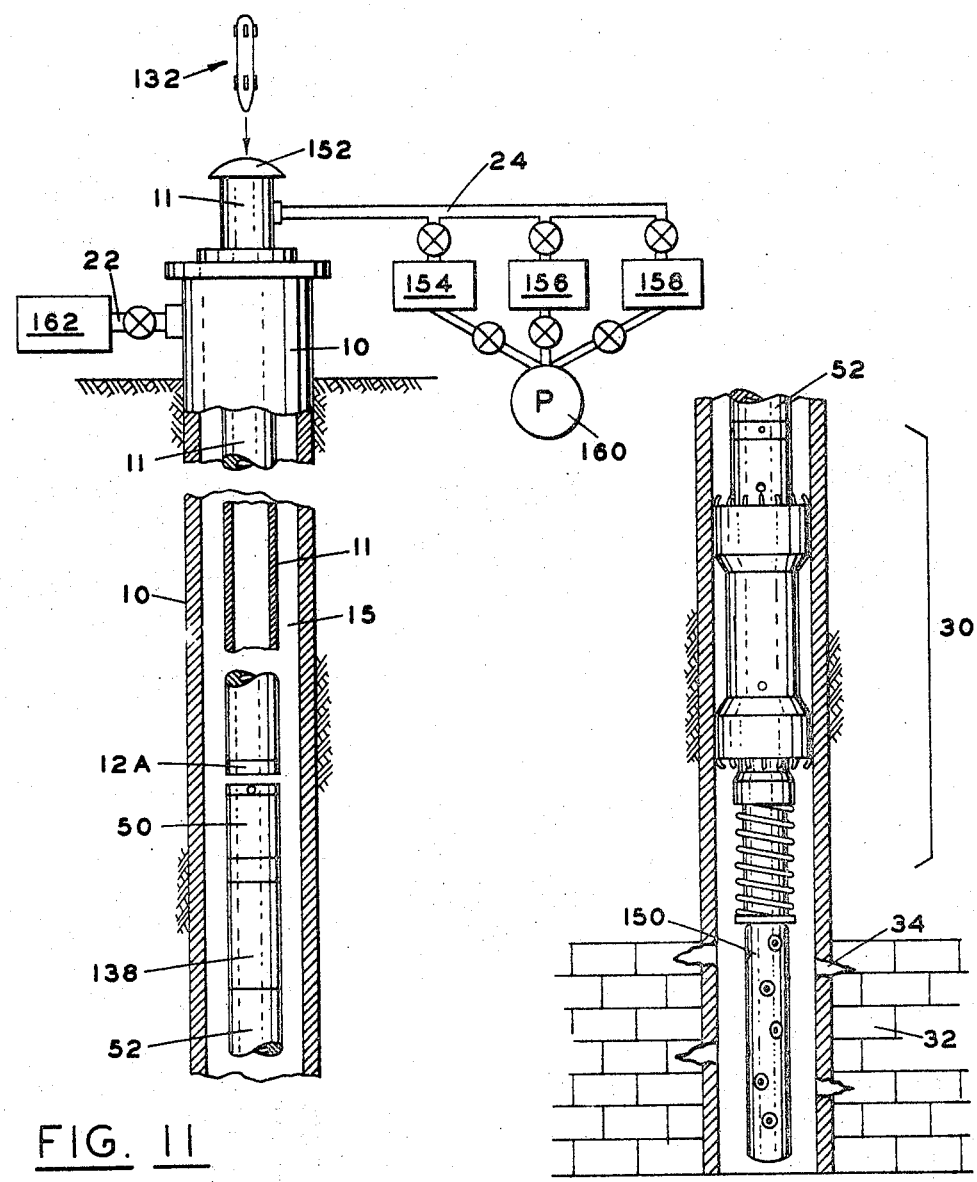

June 14, 1966   C. W. BRANDON   3,255,820
METHOD OF TREATING WELLS BY USE OF IMPLOSIVE REACTIONS
Filed Nov. 16, 1959   6 Sheets-Sheet 6

CLARENCE W. BRANDON
*INVENTOR.*

BY James R. Head

ATTORNEY 3,255,820
METHOD OF TREATING WELLS BY USE OF IMPLOSIVE REACTIONS
Clarence W. Brandon, Tulsa, Okla., assignor of fifty percent to N. A. Hardin, Catherine H. Newton, and Hazel H. Wright, jointly, and twelve and one-half percent to Orpha B. Brandon, Tulsa, Okla.
Filed Nov. 16, 1959, Ser. No. 853,405
14 Claims. (Cl. 166—40)

This invention relates to method and apparatus for creating implosive reactions. More particularly, this invention relates to apparatus for creating implosive reactions within a relatively confined space, having fluids under pressure. Still more particularly, this invention relates to apparatus and methods useful in treating subsurface formations.

An implosive effect, as distinguished from an explosive effect, is generally created by the primary immediate inrush of a high pressure fluid into a created zone of low pressure. The problem of creating an implosive reaction resides first, in establishing a zone or space of low pressure within the confines of a high pressure fluid. In some instances the high pressure is caused by hydrostatic pressures, or in other instances by mechanically created pressure, such as with pumps, compressors, etc. Secondly, the problem is one of establishing instantaneous communication or collapse between the low pressure space and high pressure fluids. The enormity of the implosive reaction and its resultant pulses will vary according to the differential pressure established between the low and high pressure spaces, the volume of the low pressure space, and upon the instantaneous communication between the two spaces.

Typically, the implosive reaction caused by the instantaneous communication of high pressure and low pressure zones creates an initial negative or rarefaction wave impulse instead of a positive pulse, as is created from an explosive reaction. Immediately following the rarefaction wave pulse is the opposite reactive, compression, or positive high pressure pulse. In some instances this latter pulse energy is greater than the former. As used and defined herein the term implosive or implosion reaction pulses is defined to include both the initial rarefaction pulse and positive or compression pulse and those pulses resulting thereafter.

In the art of drilling and producing subsurface formations containing typically oil, gas or water, or combinations of these, it becomes necessary from time to time to workover and/or completely clean out the well formation to more efficient production therefrom. Well known completion techniques such as hydraulic fracturing, acidizing and perforating have heretofore been taught and used by others. However, these completion and workover methods and apparatus typically involve the use of what might be broadly termed an explosive or positive pressure characteristic for their usefulness. In some instances, it has been found that this prevents the immediate removal of debris, mud-cake, sand, and the like, from the plugged pores of the subsurface formation and usually tends to wedge them deeper into the formation.

In the normal production or swabbing of fluids from subsurface formations by the continuous withdrawal of a packer, it appears that the low pressure area produced below the pump or swab brings debris, sand or cement materials into narrowed portions of the well, causing plugged or decreased fluid permeability.

In some instances, where a swab operation has been used alone in wells, increased production has occurred by the mixing of higher molecular weight hydrocarbons into the lighter produced crude aiding flow through previously blocked channels or pores. In other instances, however, the swabbing distrubs these heavier ends without solvent or blending action with the lighter ends, forcing them to the well and decreasing permeability.

In many wells, the gas produced around the subsurface formation will come out of solution with the oil, causing a reduction in temperature of the produced fluids which in turn causes the heavy end hydrocarbons of the produced fluids to deposit or settle out within the immediate area of the formation, causing plugging and reduced permeability.

According, it becomes an important feature of this invention to provide methods and apparatus for use of implosive reactions which overcome the objections to methods and apparatus heretofore taught and used.

One object of this invention is to provide methods and apparatus for general industrial or well use of an implosive action or reaction by the collapse of high pressure fluids under pressure into a zone or space of low pressure, and further provides means for regulating said action or reaction by variations in volume between the two zones (i.e., vary either the high or low pressure volume), the resulting differential pressure and the speed of communication between the two zones.

Another important feature and object of this invention is to provide methods and apparatus for creating implosive reactions and to provide means for utilizing the resultant energy from such reaction.

Another object of this invention is to provide a method and apparatus for treating subsurface formations and fluids for increased production therefrom by the creation of an implosive reaction within the producing formations.

A further object of this invention is to provide methods and apparatus for increasing production of fluids from subsurface formations and maintain solid material in suspension during swabbing or creation of a zone of low pressure below an upward moving piston device by simultaneously creating one or periodic implosive reaction pulses of predetermined amplitude and phase relationship, the motivating force for such reactions caused by the upward pull of said piston or swab.

Another object inclusive of the above object is to provide methods and apparatus for causing intense single or periodic pressure peaks following, equal to or greater than the pressure change of each negative implosive reaction pulse.

Another object of this invention is to provide implosive wave pulse forms, having predetermined and controllable characteristics for application to subsurface formations.

Another object of this invention is to provide methods and apparatus for producing and lifting fluids from subsurface formations to the surface by implosive reaction pulses created within the well, said pulses continuing upward for maximum lift and/or radiated downward in a short periodic manner.

Another object of this invention is to provide apparatus for creating implosive and resultant impulses, which is removably anchored in a well adjacent a subsurface formation, said impulses created by pressure fluid movement through the apparatus.

A further object of this invention is to provide methods and apparatus which is releasable under extensive hydrostatic fluid pressure within a well and further provide apparatus which is operable only under predetermined hydrostatic pressure loads to create implosive reactions.

A still further object of this invention is to provide method and apparatus for creating and utilizing implosive reactions and resultant pulses to rupture and fracture subsurface formations. An additional object of this invention is to provide methods and apparatus in accordance with the above which simultaneously maintains emulsification of fracturing liquids and/or suspension of bridging and propping agents, such as sand, etc., by the implosive reaction pulse or pulses.

A still further object of this invention is to provide methods and apparatus for creating implosive reaction impulses in combination with the rotary drilling of wells whereby drilling fluids pumped under pressure actuate apparatus for creating said pulses.

A still further object of this invention is to provide methods and apparatus for creating implosive reaction impulses in combination with a reciprocating "cable tool" drilling rig which causes said impulses to not only assist said drilling, but also lift fluids from the well.

A still further object of this invention is to provide apparatus adaptable to reciprocating type pumping equipment used in producing wells, whereby implosive reaction pulses are created in combination with said reciprocation.

An additional object in accordance therewith is to provide a unitary pumping structure for wells which eliminates standing valves at the lower end of the production tubing and for creating kinetic energy from an implosive reaction to assist in pumping fluids from the formation. Additional methods and apparatus includes selective and continuous fracturing of the subsurface producing formation by the combined pump and implosive reaction generator. A further object includes means for preselecting the intensity of the resultant implosive reaction prior to insertion within a well which is based on predetermined hydrostatic or mechanical pressure.

A yet additional object of this invention is to provide apparatus which may be readily inserted and withdrawn from a well with appropriate bypass, safety and release mechanisms to prevent sticking and overloading by fluid columns in the well.

A still further object of this invention is to provide apparatus and method for creating implosive and resultant reactions of a desired pulse form and to further provide means for changing said pulse form as to intensity and frequency readily and simply by an operator at the surface, such as by placement of the apparatus at preselected distances from the formation or device treated.

An even further object of this invention is to provide apparatus and method of creating implosive and resultant reaction pulses useful in secondary and tertiary recovery of oil from subsurface formations.

A yet, still further object of this invention is to provide method and apparatus for treatment of subsurface formations with implosive and its resultant reaction pulses while simultaneously or in combination with well known well workover and completion techniques such as hydraulic fracturing, acidizing, perforating, and cementing, etc.

A further object in accordance therewith is to provide methods and apparatus for injection of treating fluids such as fracturing fluids, solvents, acids, etc., simultaneous with the aforesaid implosive reaction pulse or timed for introduction at predetermined phase angle of the initial pulse or resultant pulses.

Another object of this invention is to provide apparatus for creating implosive reactions wherein the causative force for actuation of said apparatus occurs by fluid velocity or quantity of flow, or pressure, or by separate and distinct sonic wave generators.

A further object is to provide methods and apparatus for producing implosive reactions simultaneously or in various phase relationships in two or more wells connecting with the same subsurface formation, during swabbing, producing, treating or secondary recovery of the fluids from said well or wells.

A still further object of this invention is to provide methods and apparatus for creating implosive reactions in combination with subsurface reservoir testing means, said combination being of unitized construction to include other well known subsurface formation treating processes, solutions, and apparatus controlled at the surface in a step by step operation or in automatic timed sequence.

In accordance therewith it is an even further object of this invention to provide a unitized apparatus for perforating a formation or casing, fracturing said formation with an implosive pulse, treating the formation with treating fluids, testing the amount of formation reservoir energy and sequentially plugging same permanently or temporarily, if necessary.

An even further object of this invention is to provide apparatus useful particularly in wells for creating heat energy by producing an implosive reaction in or adjacent the well, and by the means of the implosive reaction to transfer sensible heat from the well to a distance in the formation.

A still further object is to provide apparatus for creating implosive reaction pulse or pulses capable of operation in wells from a wire line, tubing, sucker rods, drill pipe and the like.

Another important object is to permit the use of treating fluids into a producing formation by the use of the implosive reaction wherein the means of causing the reaction and the treating fluids are isolated from fluids of the well bore and are lowered into place in the well bore on a wire line or pump rods. Yet another object in conjunction with the last above object is to use the pressure of the fluids within the well bore as an assisting means in causing the treating fluids to go into the producing formation. A further object in conjunction with the last two objects is to provide means so that fluids from the well bore may follow the treating fluids into the producing formation.

These and other objects will become more apparent upon further reading of the description, operation, and claims of this invention, when taken in conjunction with the following drawings of which:

FIGURE 3 is a top continuation of the apparatus according to FIGURE 4, and represents an enlarged elevational view, partially in cross-section of apparatus for attachment to surface operational wireline, sucker rods, tubing or other apparatus, not shown.

FIGURE 4 is a detailed front elevational view, partially in cross-section, of an implosive pulse generating apparatus useful in wells according to this invention.

FIGURE 5 is a partial cross-sectional view of additional attachment apparatus for the apparatus of FIGURE 4, useful according to another embodiment of this invention.

FIGURE 6 represents a back-off or safety attachment device to the apparatus of FIGURE 4, which is useful in a further embodiment according to this invention.

FIGURES 7, 8, and 9 are schematic views of the implosive reaction method and apparatus constructed according to this invention to further aid explanation and operation.

FIGURE 10 is an elevational view, partly in section, of the apparatus of this invention in combination with well completion or work-over tools in accordance with an additional embodiment and method of this invention.

FIGURE 11 is an upper continuation of the apparatus and methods described in FIGURE 10.

FIGURE 12 is a sectional view taken along the line 12—12 of FIGURE 4.

Figure 13:
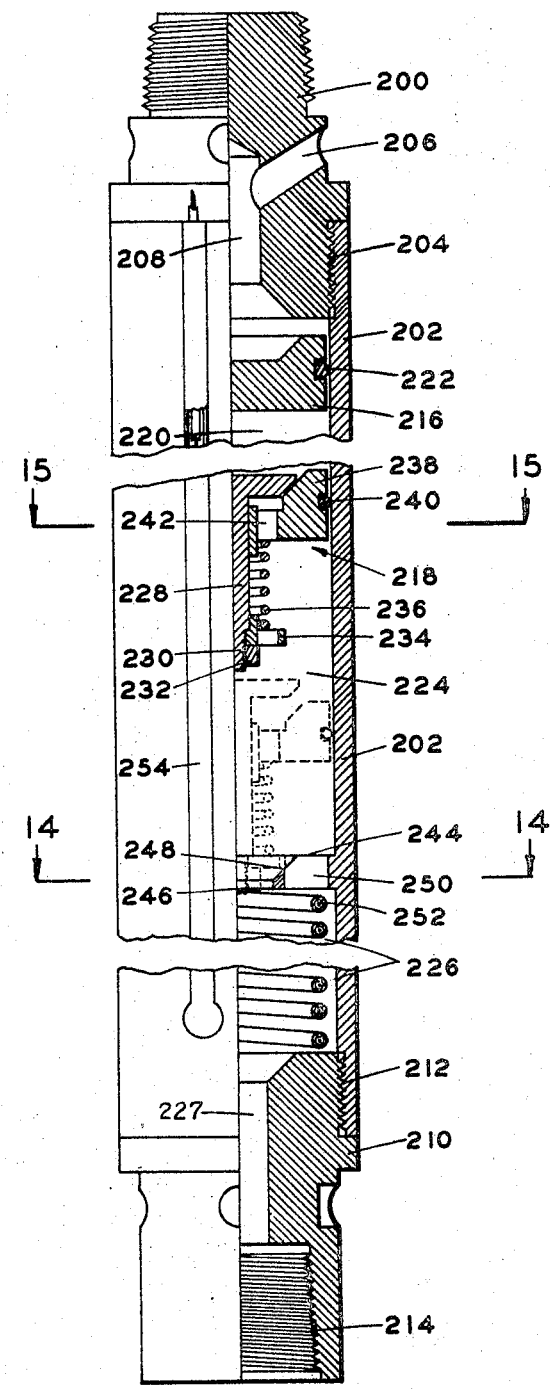

FIGURE 13 is a front elevational view partially in cross-section of a wireline operated embodiment for use in various well treating procedures using the implosive pulse generator according to this invention.

Figure 15:
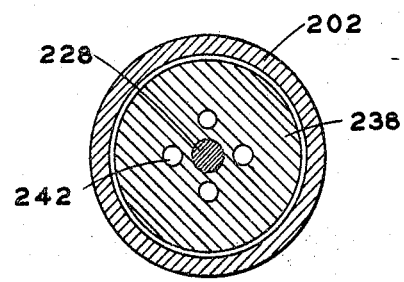
Figure 14:
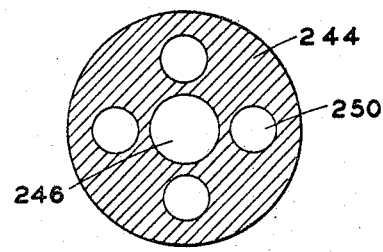

FIGURES 14 and 15 are cross-sectional views taken along the lines 14—14 and 15—15 of FIGURE 13, respectively.

Description

Figure 1:
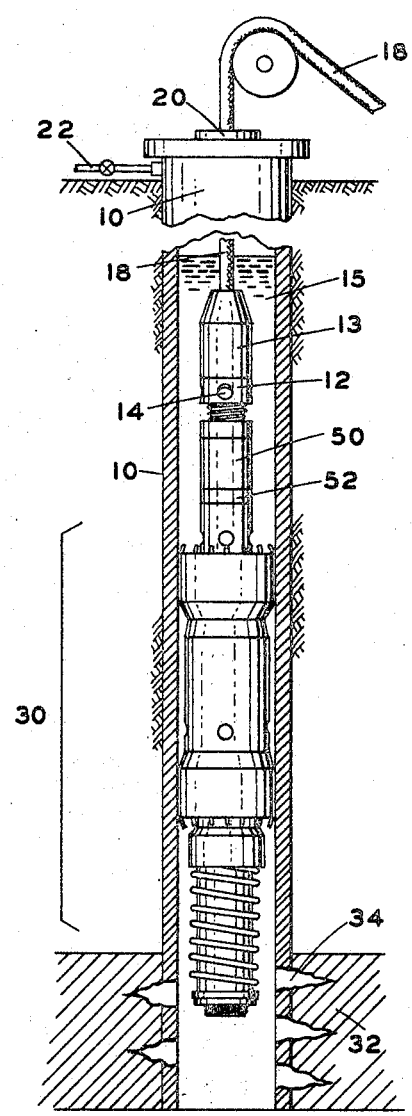
FIGURE 1 is an elevational view partly in section of apparatus constructed in accordance with this invention as suspended in operational position within a well on a wire line cable.
Figure 2:
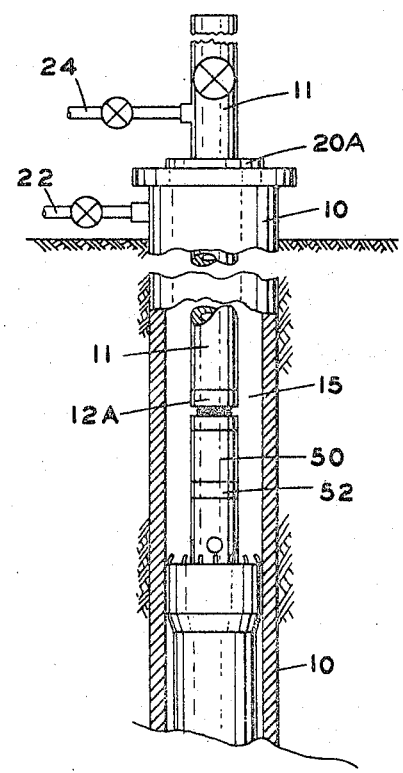
FIGURE 2 is an additional diagrammatic illustration of the apparatus of FIGURE 1, suspended within the well on a tubular attachment conduit.

Referring now to FIGURES 1 and 2, the apparatus of this invention is described in relation to use within a relatively smooth bore well casing 10. In the view of FIGURE 1, threaded connector 12 is for attachment to well known and used wireline socket tools 13 or sucker rods (not shown) for movement, placement and operation of the apparatus of this invention in casing 10. The attachment 12 is more clearly illustrated in FIGURE 3. For attachment to tubing 11, or hollow sucker rods, connector 12A is used. This is likewise described in FIGURE 5 in greater detail. Numeral 14 (FIGURE 1) designates one or more passageways extending from the fluid filled annulus space 15 into tubular passageway 16, shown more clearly in FIGURE 3. Wireline 18 extends from socket 13 to a winch or pulling apparatus at the surface, not shown. Stuffing boxes 20 and 20A are adapted to seal the annular space 15 between wireline 18 and casing 10. Valved connection 22 permits fluid control within space 15. Valved connection 24 (FIGURE 2) permits fluid control to tubing 11. The implosive reaction pulse generator is generally indicated by bracket 30 and extends within the well casing 10 to predetermined positions with respect to a subsurface formation 32 having perforations 34 providing communication with the well.

Referring now to the combined views of FIGURES 3 and 4, implosive reaction pulse generator 30 is described in relation to its use and placement within a well using a wireline or sucker rod, not shown.

A check valve 40 and seat 42 are adapted to regulate fluid flow through passageways 14 and 16. Resilient spring means 44 is adapted to maintain valve 40 in a normally closed position against seat 42 and further regulates the pressure at which valve 40 will be forced open or away from seat 42. Rotation of threads 46, part of attachment or connection 12 and valve seat 42 regulates the tension of spring 44 for control of the operating or opening pressure necessary to force valve 40 away from seat 42, the full operation and function of which will be hereinafter described.

Threaded lock nut 48 retains the spring tension position by movement about threads 46 into engagement with valve housing member 50. Valve 40 is retained in a non-opening position by threaded movement of adapter 12 to a lowermost position. In one embodiment valve 40 is forced in sealing abutment with a portion of the valve housing 50 therebelow by movement of adapter 12. Valve housing 50 threadably interconnects between adapter 12 and the implosive reaction generator 30 with one or more tubular subs 52 for attaining a desired length. The sub includes central bore 54 common throughout the length of the apparatus 30, from valve 40 into communication with the fluid in the lower portion of the well.

An inner mandrel 56 is threadably coupled to tubular sub 52 or in some instances directly to valve housing 50, and extends for the length of implosive pulse generator 30. An outer mandrel 58 is threadably connected to inner mandrel 56 at its upper end. The outer mandrel is adapted to receive unidirectional packing 60 such as the well known "cup type" packers as used in well servicing techniques and completions. The packer is adapted in one embodiment to be slideably received about mandrel 58 between an upper stop 62 and a lower stop 64. In the lower position shown, the packer is sealed to prevent fluid movement in the annular space 15 from above to below. The bottom portion of the packer, under fluid pressure above, tends to seal against stop 64. A splined or beveled portion 66 is provided adjacent packer 60 as shown, such that when the packer is moved upward relative to mandrel 58, as occurs during lowering within the well, fluids will bypass from below to above. In the event an overloaded condition occurs during upward movement of the apparatus, or it becomes undesirable to swab the fluids above packer 60, a shear release mechanism can be incorporated between the packer and mandrel 58 to permit bypass of fluids. Bypass can likewise occur by opening of valve 40 permitting fluid flow across generator 30.

Passageway 67 extends from above bypass splines portion 66 and packer 60 providing communication from the annulus space 15 into main cylinder space 68, formed between outer mandrel 58 and inner tubular mandrel 56. A cylindrical piston 70 is sealed between the inner and outer mandrels using "O-ring" type seals 72. The piston includes a connected sleeve portion 74 adapted for reciprocation therewith. Movement of the piston and sleeve is regulated as desired by spring 80, which normally tends to force sleeve 74 and piston 70 upward. A retaining sleeve 82 about mandrel 56 is engaged with retaining nut 84 threaded along the inner mandrel at the lower end to adjust tension of spring 80. Threaded lock nut 86 is provided for maintaining such a setting.

Slideably received about piston sleeve 74 between it and the outer mandrel portion 58 is assembly sleeve 88 which, as seen in cross-section, comprises an upper sleeve portion 90, sealed with respect to the sleeve 74 by "O-ring" packing means 92. A splined or slotted portion 94 exists longitudinally of assembly 88 to permit bypass of fluids in the annular space across unidirectional packer 96. Packer 96 extends in an operational direction opposite that of upper packer 60. This packer is in all respects similar to the packer 60 in its unidirectional operation and design, i.e., allows movement of fluids in one direction and prevents flow in the other direction when so positioned during operation. The cylindrical assembly 88 is normally in the position as shown, permitting bypass of fluids within the annulus space across packer 96 through slots 94 by the tension of resilient spring means 98 acting between lower sleeve 100 and retaining nut 102 which is threaded about inner mandrel 56 and held by lock nut 104. One or more spring loaded latching devices 106, one of which is shown in cross section, is provided about the periphery of assembly 88 to cause engagement with sleeve 74. Latch 106 is movable about a shaft 108 and maintained by spring means 110 abutting against cylindrical assembly 88, in engagement through a lip 112 into a recessed portion 114 of piston sleeve 74, the operational movement of which will be hereinafter described.

Latch member 106 is adapted, upon rotation about shaft 108 against the tension of spring 110, to be disengaged from recess 114 by striking release cylinder 116 which is threadably adjusted to a sleeve 118 formed as a part of nut 84. A lock nut 120 prevents movement of the cylinder 116. The lower outside threaded portion of the inner mandrel 56 is adaptable to be attached with other well servicing and drilling equipment, such as perforators, well pumps, etc.

Referring now to the embodiments described in FIGURE 5. The apparatus is similar to that described in FIGURE 3, in that it describes a top continuation attachment for the implosive reaction pulse generator mechanism 30.

Like numerals refer to like parts accordingly. The device has primary utility for attachment to tubing, drill pipe, hollow sucker rods and the like, using adapter 12A, forming passageway 16A. The passageway terminates with a rupture seal disc 130 formed as a part of valve 40A. The "go-devil" device 132 illustrated is designed for operation with the device of FIGURE 5 to rupture disk 130 and includes a body portion 134 and guide vanes 136.

Referring now to the safety back-off device 138 of FIGURE 6. The apparatus is typically installed between implosive pulse generator 30 and the upper attachment valve housing 50. However, in some instances, it is attached above valve housing 50 to adapter 12A. The device includes upper and lower cylindrical members 140 and 142 attached to each other by left-handed threads 144. Bypass openings 146 are sealed from the annulus space by O ring seal 148. In the instance a release of pressure from space 54 becomes necessary, as for example when removal of generator 30 is desired without swabbing the well and/or creating implosive pulses, right-hand rotation of cylinder 140 with respect to fixed cylinder 142 releases the seal 148 and permits fluid communication from annulus 15 to interior space 54 through openings 146. Cylinder 140 of the safety back off device 138, in one embodiment, is rotated sufficiently to allow ports 146 to be opened without being physically parted. This is dependent upon the length of the threads 144 with respect to ports 146. In those instances where the generator and/or parts connected thereto are stuck within the well, then member 140 may be physically separated to permit appropriate fishing tools to connect with member 142 and remove the stuck apparatus from the well. The relative rotation in either of the above instances occures by reason of the anchored generator which is held by pressure or stuck within the well.

FIGURES 7, 8, and 9 are schematic and diagrammatic of the sequential operation of implosive reaction, pulse generator 30. Like numbers refer to like parts in all views. The arrows are indicative of the motion of parts and pressure fluids.

FIGURES 10 and 11 show a diagrammatic assembly of an alternate embodiment using a bullet or shaped charge perforating device 150 attached at the lower end of implosive pulse generator 30. Tubing 11 connects with tubing 52 above generator 30 through connector 12A, valve housing 50 and safety back off 138, as described in FIGURES 5 and 6. Tubing 11 terminates at the surface with cap 152. Conduit 24 interconnects tubing 11 with various well treating materials schematically shown in containers 154 and 156, and 158, such as acids, fracturing fluids, solvents, plugging materials such as cement, etc., which are appropriately connected with a pump means 160. Block diagram 162 represents an energy source such as a pump, compressor, or sonic generator which connects with annulus space 15 to provide energy, if necessary, to actuate implosive pulse generator 30, as hereinafter described.

Referring now to FIGURES 13, 14, and 15, apparatus is illustrated for operation in connection with the implosive reaction generator 30 when supported within a well on a wireline or pump rods and when it is desired to treat a subsurface formation with increment injection of fluids such as acids, fracturing fluids, solvents, emulsions, sealing or cementing agents, etc. Connector or adapter 200, similar to adapter 12 (FIGURES 1 and 3) represents the top of the apparatus for attachment to a wireline socket or pump rod coupling, not shown. The adapter is threadably attached to barrel 202 at threads 204. Passageway 206 provides communication between annulus space 15 and space 208. Barrel 202 terminates at lengths up to several hundred feet or more for deep well use, to a lower connector 210 at threads 212. Lower threads 214 are usually attached to coupling 12A and valve housing 50 of the device shown in FIGURE 5, safety sub 138 and thence generator 30 respectively, somewhat similar to the view of FIGURE 1.

Barrel 202 is divided into a multiplicity of separate chambers using one or more piston devices such as 216 and 218. Free piston 216 provides a solid seal separating chamber 208 and chamber 220 using an O ring seal 222. Free piston device 218 comprises a type of check valve permitting bypass of fluids within chamber 220 to lower chamber 224, optional heating chamber 226 and thence space 227 above valve housing 50. The valved piston 218 includes a solid valve seat 228 threaded at the lower end 230 for sleeve 232 which holds perforated retaining ring 234 and spring 236 acting against piston 238 sealed against valve seat 228 and against barrel 202 with O ring seal 240. One or more ports 242 are located about the interior of the piston 238, the functional use of which will be hereinafter described.

Chamber 224 terminates with a control orifice 244 which is seen in the cross-section of FIGURE 14. The orifice includes a central opening 246 terminating the beveled stop surface 248. At least one opening 250, preferably more, are spaced about the outer portion of orifice 244, and are of such diameter that they intersect with the beveled surface 248. Orifice 246 and openings 250, providing communication with optional heating chamber 226 from chamber 224.

Heating chamber 226 includes a resistor-type heating coil 252 such as sold under the trademark "Calrod" which is connected to insulated electrical connection 254 adaptable for connection and operation with conductor cable 18, not shown in this view. The electrical connector 254 is attached or eclamped to barrel 202 in a manner well known to those skilled in the art.

*Operation of implosive pulse generator*

Although there are numerous methods and processes adaptable to this invention, broadly speaking, the purpose of the apparatus described heretofore is the creation and usage of an implosive pulse and resultant pulses within high pressure fluids which is specifically adaptable to all phases of oil well exploration, drilling, completion, workover, and production. The implosive operation comprises two fundamental steps.

(1) The creation of at least two separate fluids volumes having differential pressure therebetween, and (2) The instantaneous collapse or communication between such volumes.

Referring specifically now to the apparatus illustrated in FIGURES 1, 3, and 4 and the schematic diagrams of FIGURES 7, 8, and 9. The numerals used in FIGURES 7, 8, and 9 refer to like numerals in the specific apparatus of FIGURES 3 and 4. Packer 60 is described, however, as a fixed packer for the purpose of simplification. Preferably the apparatus 30 is used in conjunction with a confined bore, such as a cased well 10 filled with a fluid supplied through conduit 22 or filled with produced fluid from formation 32.

Using connections 12 and 13, valve housing 50 and tubular subs 52, implosive pulse generator 30 is lowered on wireline 18 to a desired position within the well with respect to formation 32. Well fluids are permitted to bypass packers 60 and 96 through splined areas 66 and 94 respectively during the lowering operation. The initial starting position will depend to a great extent upon the treatment desired. For example, it has been found that by locating lower packer 96 at distances from formation 32 equal to multiples of one-quarter of the wave length as predetermined or desired from generator 30, causes reinforcement of reflected pulses from formation 32 when repetitive or periodic pulses are generated. Reinforcement of the compressive wave pulse following the rarefied implosion reaction pulse occurs through proper placement of valve 40 with respect to the end of mandrel 54 permitting fluid injection during the compression part of the pulse or wave. Even further reinforced energy of the compression wave occurs by injecting heated fluids, such as gases, solvents, light crudes, or driving fluids such as water and liquified petroleum gases. This added energy upon attenuation will drop the energy into reconversion of heat within the formation.

Under certain conditons, such as when desired to prevent contamination of well fluids existing above generator 30, valve 40 in housing 50 is adjusted to an inoperative position by movement of connector 12 heretofore described. Using proper length of subs 52 the distance valve 40 extends from the lower end of generator 30 becomes of critical importance in certain operations as hereinafter described.

In the initial starting procedure the pressure across packers 60 and 96 is in equilibrium. Upon the reversal of movement of wire line 18, e.g., upward, bypass slots 66 are closed as packer 60 seals along mandrel 58 and shoulder 64. Accordingly, fluid within the well space 15 is prevented from passing from above to below the packer 60, by fluid pressure expanding same into sealing engagement with the tubular casing 10. Further upward movement of mandrels 56 and 58 forces pressure fluid such as hydrostatic pressure fluid into bypass 67 and cylinder space 68, forcing piston means 70 and its attached sleeve 74 downward. The amount of pressure necessary to force movement of piston 70 under the action of high pressure fluids is largely determined by the size, type, and predetermined tension setting of spring members 80 and 98. Due to interlocking engagement of latch 106 by lip 112 in recessed portion 114, the cylindrical assembly 88 is likewise caused to move downward with the sleeve and piston. Spring 110 associated with latch 106 and assembly 88 maintains this interlocked relationship. Further movement of piston 70 and assembly 88 under the pressure existing in cylinder 68, forces the upper portion 90 of assembly 88 into sealing engagement with the lower packing means 96, thereby shutting off packer bypass channel 94. Further movement thereof causes increased pressure to occur on the lower side of packing element 96 forcing it into sealing engagement with casing 10 similar to that described with packing element 60. Continued movement and withdrawal of mandrels 56 and 58 upward, begins the creation of a low pressure space between the two packing members 60 and 96 by the relative movement of the mandrel members and packer 60 upward, with respect to downward movement of packer 96 in an opposite direction. This zone of low pressure is sealed from the fluids within the casing. It appears that the resultant force of the implosion is largely a function of the differential pressure across packer 96 and the volume of space between packers 60 and 96. Accordingly, it is possible to arrive at a predetermined intensity of implosive effect by control of operational movement between the packers 60 and 96, and control of the amount of pressure existing about the low pressure zone created. Assembly 88 continues movement downward until latch means 106 strikes release or tripping member 116, providing an instantaneous movement under the action of spring 98 against lower sleeve 100 of assembly 88. Since release member 116 is threadably adjusted upon retaining sleeve 118, the distance and length of movement and hence resultant implosive effect may be readily adjusted or pre-set. The total movement of packers 60 and 96 relatively to each other, depends upon many characteristics and conditions in addition to the type of workover or completion technique required. This relative movement may be a matter of a fraction of an inch up to several inches or more.

Although there is some discrepancy as to actually where the implosive reaction pulse is created, it appears that upon the substantially instantaneous release of assembly 88, packer 96 likewise moves into abutment with mandrel 58. This instantaneous packer movement away from the pressure fluid below creates a low pressure void into which the high pressure fluids below instantly communicate to cause the initial rarefaction wave pulse.

In other instances, due to changes in spring tension and inertia between assembly 88 and packer 96, there is instantaneous communication in space 94 between the low pressure space between the packers and the relatively high pressure fluid space outside. It is known that an "in-rush" of fluids establishes the implosive reaction.

Repeated or periodic implosive pulses occur by lowering generator 30, permitting spring tension 80 to return sleeve 74 and piston 70 into engagement with latch 106. Another method consists of alternately releasing the pressure within cylinder 68. A yet further method is the use of a sonic pulse or periodic sonic waves being caused in the fluid within space 15 of casing 10. In many instances the created implosive and associated pulses release the pressure sufficiently to cause reengagement with the assembly 88.

Operation in accordance with this invention using tubular apparatus of FIGURES 2, 5, and 6 is substantially the same as using the wire line apparatus described above, i.e., the implosive generator 30 operates in the same manner. The tubular apparatus has particular utility when it is desired to continuously add treating fluids or materials to the subsurface formation below the generator 30 independent of annulus fluids, as more particularly described heretofore and generally under the subheading: Well Completion.

The implosive reaction occurring from the communication of high and low pressure zones in the fluid about packing members 60 and 96, causes a negative or rarefaction pressure pulse. This pulse is impressed upon the pores of the producing formation through the coupled fluid existing within the well and formation. The fluid exists within the well as produced fluids or is pumped into the well prior to inserting the generator 30. Accordingly, the coupling fluid used is an important phase of this invention in well completion and workover. If the apparatus is used primarily as a swabbing tool, the formation fluids will form the coupling medium, whereas in other instances oil well acids, solvents, fracturing fluids and drilling fluids are also capable of use with the invention. Following the negative pulse there will be a positive pressure pulse of up to several thousand atmospheres per square inch or higher. Likewise, the high pressure pulse immediately following the rarefaction pulse enters the producing formation with increased beneficial effect for increasing production of fluids therefrom, but unlike the rarefied pulse is also propagated upward within the well.

*Swabbing wells*

The apparatus is readily adaptable for use as a type of wire line swab for cleaning oil well formations as illustrated in FIGURE 1. By a continuous withdrawal of the device up the well an alternating implosive reaction occurs during such travel until the hydrostatic fluid pressure in space 15 is incapable of further movement of pistons 70 within the generator.

Where the device is continuously withdrawn up the well, valve 40 must be set in an operating condition whereby the upward pull of the device is not sufficient to cause opening of the valve. The valve is caused to be opened, however, when the rarefied wave pulse travels upward in tube space 54 and reaches the underside of valve 40. The differential pressure across valve 40 causes the valve to open, allowing fluid thereabove to be induced down tube 54. This same induction of fluid at valve 40 also causes piston 70 and member 74 to move upward by the action of spring 80, relatching into assembly 88 which carries lower packing member 96. In this manner fluid above generator 30 is caused to go into the fluid existing below during the compressive or high pressure pulse that follows the rarefied pulse due to the implosive reaction.

As the generator is pulled along the well, the implosive reaction pulse begins to vary in frequency, such frequency and energy being sufficient in many instances to fracture the subsurface formation.

In some instances sufficient pressure is established in the fluid above the apparatus from auxiliary sources, through conduit 22 to actuate the apparatus where hydrostatic pressure is not available or insufficient. A unidirectional (check type) valve can be located within outlet conduit 22 operable under predetermined pressure conditions in order to maintain sufficient back pressure within well space 15 and cylinder 68 of generator 30 for operation. The implosive rarefaction pulse effect caused by the apparatus according to this invention, places a momentary pressure differential between the well fluids and the fluids in the formation with the formation fluids tending to move towards the well. Thereafter, the rarefaction pulse effect is reversed by a high pressure impulse into the widened area of the formation near the well.

In another embodiment, instead of a continuous lift swab, a reciprocating motion is transferred to wire line 18 from, for example, a cable tool drilling rig.

It can thus be seen that during what would be a normal swabbing of a well, an implosive reaction occurs, by proper setting of device 30 to the amount desired to formation 32.

Pumping wells

The apparatus of this invention has further utility when used in conjunction with a reciprocating type oil well pump. The implosive rarefaction pulse creates a momentary suction effect on the formation fluids bringing them into the pump proper for lifting to the surface. In addition the high pressure positive pulse following causes debris, normally plugging the formation pores, to be forcefully radiated outward. The reciprocating movement of pump rods provides the necessary force to actuate generator 30 and to create the low pressure space with respect to the surrounding high pressure zones with further communication between them resulting in the implosive effect. This continued effect not only prevents clogging of the formation pores and fractures, but is also sequence timed to assist fluid movement to the well surface. In one embodiment the implosive reaction pulse occurs during the upward pump stroke, however, this is not to be held limiting as the pulse can be initiated in the down stroke or on both strokes.

Well completion

A typical completion or workover of subsurface formations using the implosive pulse generator of this invention is illustrated in FIGURES 10 and 11. Bullet or jet perforator 150 is fired from the surface or by timed sequence apparatus to provide openings 34 through casing 10 into formation 32. Communication exists thereafter, for example, from the formation to central bore 54 of mandrel 56 through the perforator 150.

Fracturing of the formation, if necessary or possible, occurs in many ways. For example, valve 40 is placed in an inoperative position by placing sufficient tension on spring 44, shown in FIGURES 3 and 5, so that the valve will not open. Generator 30 is actuated by pressure pulses in annulus fluid 15 from source 162 or which may be hydrostatic pressure. The implosive pulse plus the high pressure positive pulse reaches proportions sufficient to cause breakdown or rupture of the formation. In some instances incidental fracturing of the formation from the well bore occurs by the implosion effect. However, it is preferred to establish pressures in the space below generator 30 up to or near the formation breakdown pressure prior to initiating the implosive reaction pulse. Pressures sufficiently greater than the formation breakdown pressure are created to overcome the overburden pressure which is generally estimated as approximately equal in p.s.i. to the depth of the formation in feet.

As a further example of a fracturing procedure, valve 40 in housing 50 is adapted to open at a predetermined pressure. The setting of that pressure occurs through adjustment of coupling 12A being rotated with respect to threads 46 as described in FIGURES 3 and 5. In the preferred embodiment the valve is regulated and preset to open when the implosive rarefaction pulse is initiated in the coupling or fracturing fluid existing below packer 96 and in tubular bore 54. As the rarefaction pulse passes the lowermost portion of the mandrel, an induced rarefaction wave is caused upward through the central bore creating a pressure differential across valve member 40, opening same and inducing a pulse of pressure fracturing liquid from storage 154. The injection of such fluid in one embodiment is timed with the wave pulse directed toward the formation being treated to perform cancellation, reinforcement or augmentation of the induced wave pulses. The additional fluid or treating liquid in the wave pulse becomes useful as a makeup for fluids forced into the pores or fractures of the formation.

An even further procedure for rupturing or fracturing subsurface formations using apparatus of this invention includes use of rupture seal 130 with valve 40 as illustrated in FIGURE 5. When it is desired to use large quantities of fracturing fluid after initiation of the fracture using implosive pulse generator 30, seal disc 130 is ruptured by pressure or go-devil 132. Pump or pumps 160 thereafter force additional fracturing fluid from storage 154 into the well to extend the fracture with or without simultaneous implosive pulses.

Although fracturing fluids have been particularly described, above, this is not limiting as other well treating fluids, such as acids, solvents, etc., stored in container 156 may also be used in the completion or workover of wells in conjunction with the implosive pulse generator 30.

As a further example of use of the apparatus particularly described in FIGURES 10 and 11, after perforating and fracturing, a drill stem test of reservoir 32 can occur by rupture of seal disc 130 of valve 40 permitting fluids to enter tubing 11 for measurement. In the event productivity is insufficient for producing the formation, or water encountered, a still further embodiment includes pumping or squeezing of sealing materials, such as cement, into the formation using a pump 160 and sealing materials from storage, e.g., 158 in a manner well known to those skilled in the art. In some uses no more pressure is necessary other than the hydrostatic head of cement within tubing 11 to effect operation.

Accordingly, it can be appreciated that this invention concerns apparatus which is capable of a multiplicity of separate well treating or completing operations assisted by implosive reaction pulses, and the resultant energy therefrom. Typically operation of generator 30 requires a separate power source 162 connected to the annular space and cylinder space 68. As heretofore explained this may be a sonic generator, pump or compressor.

As a further embodiment of this invention wire line apparatus constructed according to that illustrated in FIGURES 13 and 14 is of particular utility in completing wells where smaller quantities of treating fluids, such as acids, emulsions and corrosion inhibitors, etc., are adequate.

In operation the treating fluids are placed in chamber 220 above valved piston 238. This is ordinarily done at the surface with threaded member 200 and free piston 216 removed from the barrel 202. Barrel 202 is of sufficient length to provide the required volume of space 220 for treatment of the well, lengths up to several hundred feet or more for deep wells are taught.

In some instances valved piston 218 is removed, filling barrel 202, including chambers 220 and 226 with treating fluids above valve 40 in housing 50, which ordinarily attaches at lower threads 214. Usually the back-off safety joint 138 and implosive pulse generator 30 are below housing 50 respectively. Valved piston 218 or free piston 216 is placed on top of the treating fluid for isolation between batches of other treating fluids or well fluids acting through passage 206 and chamber 208 under hydrostatic pressure head. This latter pressure assists the entrance of treating fluid at predetermined phases of implosive reaction, usually the compression pulse through valve 40 into the producing formation.

If solid free piston 216 is used atop the treating fluids within chambers 220 and 226, treating fluid entry ceases when the piston strikes stop orifice 244. In many treating operations, however, it is necessary to follow one batch of treating fluid with a follower fluid. In that event valved piston 218 is placed atop the initial treating fluid with the follower treating fluid thereabove. In some instances one or more follower fluids are to be injected into the formation and this would necessitate additional valved piston members 218. Atop the last of these treating fluids, solid free piston member 216 is used for isolation from the annulus fluids. In operation with valve piston device 218, movement of the treating fluid into the formation occurs until piston 218 strikes stop orifice 244 as shown in the dotted line. Further pressure in the follower treating solution above forces the piston portion 238 from its seat 228 permitting fluid entry through orifices 242, 250, and/or 246 of the stop orifice. The follower treating fluid batches continue their injection until solid piston device 216 strikes valved piston 218. In some instances it is desirable to follow the treating fluids with fluid from well space 15. This is accomplished by utilizing valved piston device 218 as the top piston member.

In some well treating operations, heating of the treatment fluids prior to their entrance to the formation is desired. Accordingly, a heating chamber 226 may be provided as shown attached to the lower portion of barrel 202. Electrical conduit 254 supplies electricity to a resistance type heating coil or coils 252, such as that sold under the trademark "Calrod," which has an errosive and corrosion protected and insulated cover. Although it has been found that the implosive pulse generator 30 in itself creates heat energy which is capable of being utilized into the formation, the heating chamber 226 adds additional heat energy into a desired phase angle portion of the compressive pulse resulting from the implosive reaction. This heating chamber 226 and coils 252 as described above may also be used above valve 40 where attachment means 12A of FIGURE 5 is used for connecting apparatus 30 to the surface in order to introduce therein fluids for treating formation 32. In this manner, heated fluids are directly introduced into the compression or high pressure pulse that follows the rarefied pulse of the implosive reaction into the formation, and upon attenuation of the pulses out in the formation this heat will be deposited therein for beneficial effects.

In addition to use as a wireline treating fluid injection chamber, the apparatus described in FIGURES 13 and 14 is also capable of use with the implosive pulse generator 30 of this invention in combination with cement squeezing or plugging operations to sealing off production of undesired fluids, patching leaks in casing, etc., at a minimum of trouble and expense.

*Secondary recovery*

It has been found that in many secondary recovery projects, e.g., water drive from an injection well to a producing well, implosive reaction pulses can assist removal of oil trapped in minute pore spaces. Accordingly, the apparatus taught according to this invention has further application by placement within an injection well or alternately in both injection well and producing wells. In the latter instance, it is highly possible to cause cyclic pulsation through the formation by proper timing of the implosive pulse generators. For such use, the producing well apparatus would provide means for lifting the fluids from the well to the surface.

It is entirely within the purview of this invention that in gas drive or underground combustion recovery techniques that implosive reaction pulses generated in accordance with this invention be utilized to assist gas flow or maintain combustion within the formation respectively.

*Well drilling*

Although the use of an implosive pulse generation system has been described for use with a reciprocating cable tool type drilling apparatus, it is within the further purview that the implosive generator of this invention be combined with a rotary drilling system. For example, by placement of an implosive pulse generator at or near the bit and operable under drilling fluid pressure, such would impart not only a rotary percussion drilling action, but also assist in removal of cuttings into the annular flow stream, and thence to the surface.

Although I have described the apparatus of this invention as a removable type apparatus, i.e., using tubing or wireline, the apparatus is also capable of being permanently anchored or formed as a part of a permanent well completion apparatus capable of being placed into use at the demand of the operator. Accordingly, anchor slips may be formed as a part of the apparatus, as is well known to those skilled in the art. In that event, the upper packing member 60 is usually retained in a permanently sealed position. As heretofore described, a separate source of high pressure fluid is introduced into the generator 30 to cause operation.

In still another embodiment wherein valve 40 is allowed to operate, the device 30 may be anchored at a particular location and fluids pumped through the device and thus cause an alternating series of the implosive reactions, this being similar to the occurrence when device 30 is pulled upward against fluid in a well, as in swabbing. That is, actuating fluids are pumped downward through annulus space 15 and thence through passageway 67 into cylinder space 68 against the top of sleeve or piston 74. This will cause an implosive reaction as previously described which in turn permits periodic release of the pressure fluid existing above valve 40. The periodic release of pressure fluid through valve 40 coincides with the frequency of the standing wave of the particular harmonic of the fundamental wave frequency in the fluid used below the generator unit 30. Additionally, the particular harmonic is created in accordance with the length of the unit 30 from the bottom of the well and the reflected quarter of a wave therefrom.

Although this invention has been described with reference to specific and preferred embodiments, it will be apparent, however, that many modifications can be made without departing from the spirit and scope of the invention. Accordingly, this invention should be considered not to be limited to the embodiment herein described, but should be limited only to the scope of the appended claims.

I claim:

1. A method of injecting treating fluids into a subterranean formation penetrated by a well, comprising the steps of introducing a fluid medium into said well separate from said treating fluid, creating a volume within said medium adjacent the formation to be treated of pressure less than said medium, substantially instantaneously collapsing said volume to create at least once a rarefaction wave pulse followed by a compression wave pulse, injecting said treating fluid into said fluid medium in timed sequence with said compression wave pulse, and conducting said rarefaction and said compression pulses to said formation.

2. A method of injecting treating fluids into a subterranean formation according to claim 1 wherein said treating fluid is at a temperature above said fluid medium.

3. A method of injecting treating fluids into a subterranean formation according to claim 1 wherein said treating fluid is a formation permeability reducer.

4. A method of injecting treating fluids into a subterranean formation according to claim 1 wherein said treating fluid is a formation permeability increaser.

5. A method of injecting treating fluids into a subterranean formation according to claim 1 wherein said treating fluid is a formation pore volume increaser.

6. A method of increasing the productivity of subterranean formations penetrated by a well comprising the steps of introducing a treating fluid medium into said well, creating a volume within said medium adjacent the formation to be treated having a pressure less than said medium, substantially instantaneously collapsing said volume to create at least once, a rarefaction wave pulse followed by a compression wave pulse, injecting said treating fluid in timed sequence with said compression wave pulse, and conducting said rarefaction and said compression pulses to said formation.

7. A method of increasing the productivity of subterranean formations according to claim 6 wherein said treating fluid is at a temperature above the temperature of the produced fluids of said formation.

8. A method of treating subterranean formations according to claim 6 wherein said treating fluid medium is a formation permeability reducer.

9. A method of treating subterranean formations according to claim 6 wherein said treating fluid medium is a formation permeability increaser.

10. A method of treating subterranean formations according to claim 6 wherein said treating fluid medium is a formation pore volume increaser.

11. A method of injecting treating fluids into a formation penetrated by a well containing a pressure fluid medium in said well moveably separated from said treating fluid by a piston comprising the steps of creating a volume within said medium of pressure less than said medium, substantially instantaneously collapsing said volume to create, at least once, a rarefaction wave pulse followed by a compression wave pulse, forcing said treating fluid into said formation in timed sequence with said compression wave pulse under the pressure of said medium acting against said piston, and conducting said rarefaction and said compression pulses to said formation.

12. A method of injecting multi-component treating fluids into a formation penetrated by a well containing a pressure fluid medium acting against said treating fluids each component of which is moveably separated by pistons, comprising the steps of creating a volume within said medium of pressure less than said medium, substantially instantaneously collapsing said volume to create, at least once, a rarefaction wave pulse followed by a compression wave pulse, consecutively forcing said multi-component treating fluids into said formation in timed sequence with said compression wave pulse under the pressure of said medium acting against said pistons, and conducting said rarefaction and said compression pulse to said formation.

13. A method of increasing fluid production of formations penetrated by a well, comprising the steps of (1) continuously withdrawing fluid medium undirectionally from said well, (2) simultaneously creating a volume in said well of pressure less than the said medium, (3) substantially instantaneously collapsing said volume to create implosion reaction pulses and (4) conducting the said implosion reaction pulses to said formation.

14. A method of increasing fluid production of formations according to claim 13 whereby steps (2), (3), and (4) are sequentially repeated.

References Cited by the Examiner
UNITED STATES PATENTS

| | | | |
|---|---|---|---|
| 1,730,337 | 10/1929 | Bellocq | 103—1 |
| 2,018,700 | 10/1935 | Blan | 103—1 X |
| 2,080,184 | 5/1937 | Quaglia | 166—63 X |
| 2,090,616 | 8/1937 | Erwin | 166—164 X |
| 2,281,751 | 5/1942 | Cloud. | |
| 2,290,141 | 7/1942 | Burt | 166—44 |
| 2,361,558 | 10/1944 | Mason | 166—46 X |
| 2,859,818 | 11/1958 | Hall et al. | 166—9 |
| 2,871,943 | 2/1959 | Bodine | 166—42 |
| 2,898,084 | 8/1959 | Eckel et al. | 175—1 |
| 3,016,093 | 1/1962 | Bodine | 175—56 |
| 3,016,095 | 1/1962 | Bodine | 166—177 |

CHARLES E. O'CONNELL, *Primary Examiner.*

BENJAMIN BENDETT, *Examiner.*

C. O. THOMAS, *Assistant Examiner.*